United States Patent [19]
Tseng et al.

[11] Patent Number: 5,852,714
[45] Date of Patent: Dec. 22, 1998

[54] REAL TIME BROADCASTING SYSTEM ON AN INTERNET

[75] Inventors: Wei-Jerng Tseng, Taipei; Jun-Yih Lee, Kaohsiung; Ching-Feng Wang, Tainan, all of Taiwan

[73] Assignee: Eten Information System Co., Ltd., Taipei, Taiwan

[21] Appl. No.: 861,325

[22] Filed: May 21, 1997

[51] Int. Cl.⁶ ................................................ G06F 15/00
[52] U.S. Cl. .............................. 395/187.01; 395/188.01; 395/200.59
[58] Field of Search .............................. 395/187.01, 186, 395/188.01, 200.59

[56] References Cited

U.S. PATENT DOCUMENTS 5,375,244  12/1994  McNair ................................ 395/187.01
5,481,720   1/1996  Loucks et al. ...................... 395/187.01

*Primary Examiner*—Ly Hua
*Attorney, Agent, or Firm*—Knobbe, Martens, Olson & Bear, LLP

[57] ABSTRACT

The present invention utilize the systems described blow to carry out the real time broadcasting on an Internet. Data-collection processing system for collecting and processing the original packages sent by all data-sources connected to the data-collection processor system. Receiving system is used for sending out user's information utilized in the authentication about a user. In addition, the receiving system receives packages of selected kinds of data-source and examines which packages are missing. Also, the receiving system sends out the number representing data-sources of a missing package. Besides, the authentication system is included for examining whether the user is registered, and transmitting the number representing data-source requested by the receiving system to the multi transmitting system. Another function is to assign a source of the most light loading to provide data for the user and sending address of the source to the receiving system. Also, the multitransmitting system is contained for the following function as receiving the output of the data-collection processing system, sending packages of the selected types of data-sources to the receiving system. One other function is to send the package which is lost in the receiving system, besides send the loading and address of the multi transmitting system to the authentication system to provide the base used to assign the source providing information for the receiving system. In which the output of the multi-transmitting system contains the serial number representing the order that the original packages arrive at the data-collection processing system, and the original packages are sent by all the data-sources.

21 Claims, 6 Drawing Sheets

REAL TIME BROADCASTING SYSTEM ON AN INTERNET

BACKGROUND OF THE INVENTION

1. Field of the Invention

The present invention relates to a real-time broadcasting system on the internet, which is used to transmit the real-time information. The present invention particularly relates to a system that can authenticate the client and transmit different types of information according to the request of individual client.

2. Description of the Prior Art

Usually, the application of broadcasting system on an internet operates in the way that systems collects the information sent by information sources and then send it to the clients. As the numbers of clients grow, the system will suffer from overloading. The other problem is that once there are 10 clients, each need 10 kinds of information thus the bandwidth of transmitting channel must adapt 100 bandwidth. This always results in the bottleneck of communication as well as reduces the possibility of real-time broadcasting. As the loading of a system is fixed, if the number of client increases, there must be more systems on line to provide information for the user. To solve this problem in an internet broadcasting, a architecture of multi-cast system is utilized.

A multi-cast system used in an architecture that is different from the traditional internet can solve the problems mentioned above. That is to say, the multi-cast system can reach the goal that one system emits the information and every user on the internet can receive all the information. Thus there in no need to purchase more hardware when the number of client increases, because every user on the net can receive all the information sent by the system. The architecture of the net that the multi-cast system is used is shown in FIG. 1. If there is a multi-cast system in local network 100 broadcasting information, all the clients in local networks 110, 120, and 130 can receive all the information broadcasted by multi-cast system. In this type of network, the architecture is different from that of the traditional internet. For example, the router in the traditional network must be replaced by multi-cast router as shown in FIG. 1 as multi-cast router 102, 112, 122 and 132.

In the traditional architecture of TCP/IP, the router is used to connect two different types of networks such as Ether net and Token ring. Besides, the router is able to convert the frame of one protocol to the other protocol such as TCP/IP and IPX. Furthermore, the router accesses the package according to the network address and physical address by way of the best path. Whereas the traditional router can not be utilized in the architecture of multi-cast system.

Since the router used in the traditional TCP/IP architecture can only process class A address, class B address and class C address, without proceeding with class D address. To perform the multi-cast broadcasting, the traditional TCP/IP router must be replaced by multi-cast router to proceed class D address. If data-collector 107 receive the packages of data-source W103, data-source X104, data-source Y105 and data-source Z106, then data-collector 107 sends packages through multi-cast router 102 to local network 110, 120, and 130. The multi-cast router 112, 122, 132 receive the packages and analyze the class A address, class B address, class C address and class D address. Then the users in every local network can receive the data broadcasted by data-collector 107. Thus the users 113, 123, 133 respectively located in local network 110, 120, 130 can receive all the data broadcated by data-collector 107. Since data-collector 107 does not process the information sent by data-sources, every users in local networks with multi-cast router receives the same data which contains the data sent from all the data-sources W103, X104, Y105 and Z106.

In the application of the multi-cast broadcasting network, the hardware and software must be modified to suit this application. The modification is shown in FIG. 1 as multi-cast router 102, 112, 122 and 132. This kind of router is more expensive than the traditional router used in the traditional internet. Though there is no problem of loading in the multi-cast broadcasting system, there is some problem in data selectivity of users. For example, the user wants the data from different data sources, such as user 113 wants the data from W103 and X104, user 123 wants the data from W103, X104, and Z106, whereas user 133 wants the data from X104, Y105 and Z106. In the multi-cast broadcasting system, user 113, 123 and 133 receive data from all the data-sources W103, X104, Y105 and Z106. The user in the multi-cast broadcasting system receives the unnecessary data, thus the source of hardware is wasted and the efficiency is low. The most important is that the multi-cast broadcasting system can not be carried out in the traditional internet, so there must be some method to implement the broadcasting in a traditional internet. Because the multi-cast broadcasting architecture of network can not authenticate the user, it is inappropriate to transmit the valued information.

SUMMARY OF THE INVENTION

Form the above mentioned reasons, the broadcasting system in the traditional internet must be modified to the multi-cast broadcasting system to perform the function of multi-cast broadcasting. It is impossible to perform the multi-cast broadcasting in the traditional TCP/IP protocol. The router must be replaced by multi-cast router to perform multi-cast broadcasting. The primary goal of the present invention is to implement the broadcasting on the traditional architecture of internet to spare the change of hardware and software.

The other purpose of the present invention is to offer the information of different contents according to the different request of the users. Thus the user can choose any information they want, and the information provider is able to provide the information of according to the need of users. Thus the information provider can provide more service to more clients under the limited transmitting bandwidth. The present invention has more flexibility in transmitting information and the efficiency of bandwidth.

Another purpose is that the present invention offers the authentication of the user. The secret and security is maintained in the broadcasting system of the present invention. In addition, the loading of hardware can be balanced by dynamical adjustment. Once the user is authenticated, the system of the present invention will assign an address of information provider to the user according to the loading of the information provider. Thus, the loading of the multi-transmitting system, i.e., the information provider, is better balanced. Furthermore if the multi-transmitting system is break down, the users on the load of a multi-transmitting system will be transferred to another multi-transmitting system.

According to the purpose mentioned above, the present invention offers a system of real-time broadcasting on the internet. Such a system contains a data-collection processing system which is used to collect all the packages sent by all the data-sources that connected to data-collection processing system. The data-collection processing system collects the packages and assigns serial number to those packages according to the arriving order of the packages. In addition, the data-collection processing system stores the serial number, data-source representing character, the length of the package and the address where the package is stored in a memory, and all are transmitted to the multi-transmitting system. The data-source representing character is added to the package by the data-collection processing system, which is used to represent the kind of data-source.

The authentication system is used to authenticate the user and accept the kind of information that the user requests. In addition, the authentication system also can assign the source that provides information for the user according to the loading of the multi-transmitting system.

Receiving system plays the roll of receiver of the user, which is used to receive the information and examine the missing package. Thus the missing package can be sent again by the multi-transmitting system, and then the missing package is received by the receiving system. The receiving system also can send the username and password to the authentication system as the accordance of authenticating the user, and then the authenticating system informs the receiving system that whether the user pass the authentication.

The multi-transmitting system is used to get the information sent by all the data sources. Besides, the address of the receiving system, the kind of information and the number representing the package lost by the receiving system all are sent to the multi-transmitting system. Then the missing package is sent to the receiving system according to the number representing the lost number. In addition, the loading and the address of the multi-transmitting system is sent to the authentication system. In the other application, if the number representing the kind of information is not added by the data-collection processing system, it can be added by multi-transmitting system.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

In the real time broadcasting system of the present invention on the internet, the system of the present invention can prosecute the authentication of the user. Furthermore, the real time broadcasting system of the present invention assigns an address of multi-transmitting system to the user, which the multi-transmitting system can also transmitting the data that come from different type of data-sources to the receiving system according to the request of the user. In addition, if some packages are lost during the receiving system receiving the packages, the multi-transmitting system can sent the lost packages to the receiving system again. Thus the present invention can make sure that the package is all received by the receiving system.

Figure 2:
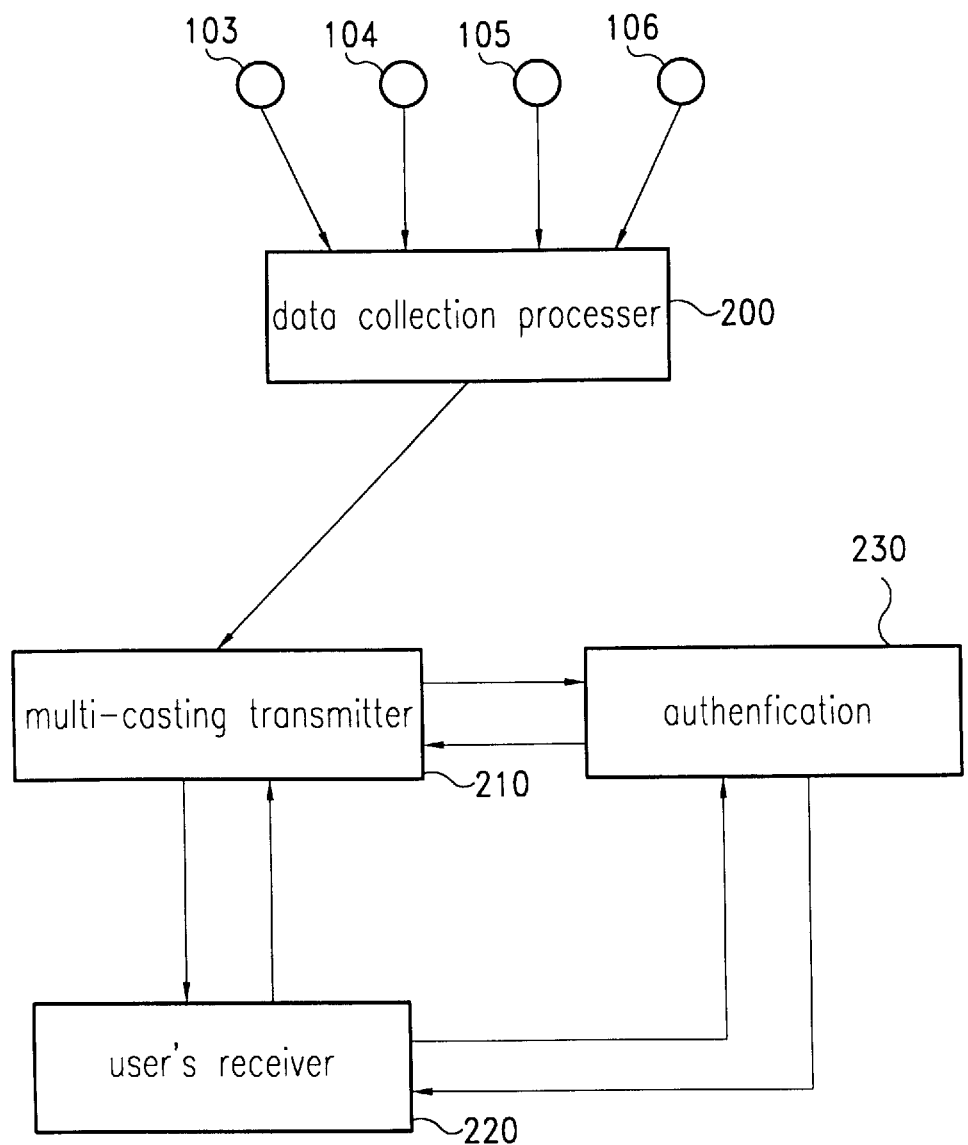
FIG. 2 shows the block diagram of the present invention.

The architecture of the system of the present invention is shown in FIG. 2. The data collection processing system 200 is used to collect all the packages sent by data-source W103, data-source X104, data-source Y105, and data-source Z106. Then the data collection processing system 200 add a sort-number to those packages according to the order that those packages arrive at the data collection processing system. Then, the data-collection processing system adds a bit to the packages according to the data-source which the packages come from. The following step is to combine several packages with the sort-number representing arrival order and the bit representing the data-source to a data block. Every data block is stored in the memory and sent to the multi-transmitting system 210.

Multi-transmitting system 210 receives the packages sent by data collection processing system and stores the packages according to the data source. Besides, the multi-transmitting system 210 sent the address and loading of itself to the authentication system 230.

On the other side, the receiving system 220 sends the username, password, the kinds of data source that user wants and the address of the receiving system 220 itself to the authentication system 230. The following step is to compare the username and password which are sent by the receiving system with the username and password stored in the authentication system 230.

If the username and the password are both correct, then the authentication system 230 assigns a multi-transmitting system 210 as the information provider for the receiving system 220 according to the latest multi-transmitting system load-address table. In the load-address table of the multi-transmitting system, the load and address of every multi-transmitting system is recorded, thus the authentication system 230 can choose a multi-transmitting system having light loading as the information provider. According to the table mentioned above, the address of the chosen multi-transmitting system is sent to the receiving system 220.

Also, the authentication system 230 sends the types of the data source that the user wants to the multi-transmitting system 210 that is chosen by the authentication system 230. Subsequently, the multi-transmitting system 210 sent the address and loading of the multi-transmitting system 210 itself to the authentication system 230 to refresh the multi-transmitting system load-address table.

Then the authentication system 230 sends an information to the receiving system 220 to show that whether the user is permitted to login the broadcasting system of the present invention. If the user is permitted to login the broadcasting system of the present invention, the authentication system 230 will sent more information to the receiving system 220 such as the address of the multi-transmitting system 210 and the serial number of the port of receiving data.

Thus, the multi-transmitting system 210 and the receiving system 220 are able to connect, and the data transmission is ready to start. In order to speed up the transmission of data, the protocol used between receiving system 220 and multi-transmitting system 210 is user datagram protocol (UDP). If there are some packages lost when the packages are received by receiving system 220, the receiving system 220 will send the kind of data source and the sort-number to the multi-transmitting system 210. Then the multi-transmitting system 210 sends the packages relative to the kind of data source and the sort-number to the receiving system 220 using the TCP (transmission control protocol) protocol.

For the reason mentioned above, though the protocol used to transmit the packages from the multi-transmitting system 210 to the receiving system 220 is UDP, yet the packages are assured to be received without lost. Because the receiving system 220 is able to examine whether the sort-number of the received packages is continual. If the sort-numbers are not continual, it means that there are some packages lost. Accordingly, the receiving system 220 sends the packages of the absent serial numbers and the number representing data-sources to the multi-transmitting system 210. Then the multi-transmitting system 210 transmits the packages relative to the mentioned above information to the receiving system 220 by TCP. Thus the packages are ensured to arrive at the receiving system 220.

Figure 1:
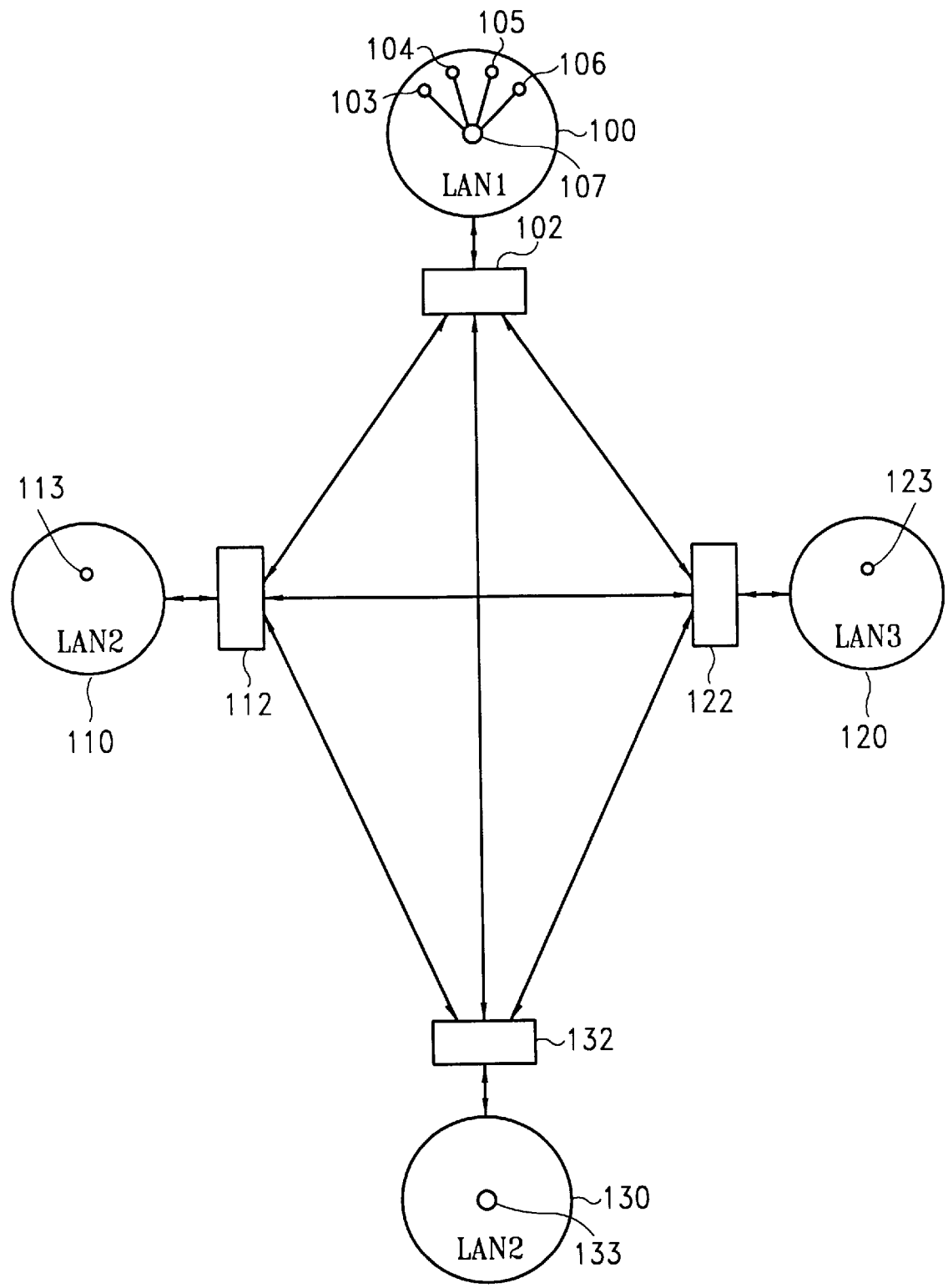
FIG. 1 shows the real time broadcasting system on the internet, which using the architecture of traditional multi-cast system.
Figure 3:
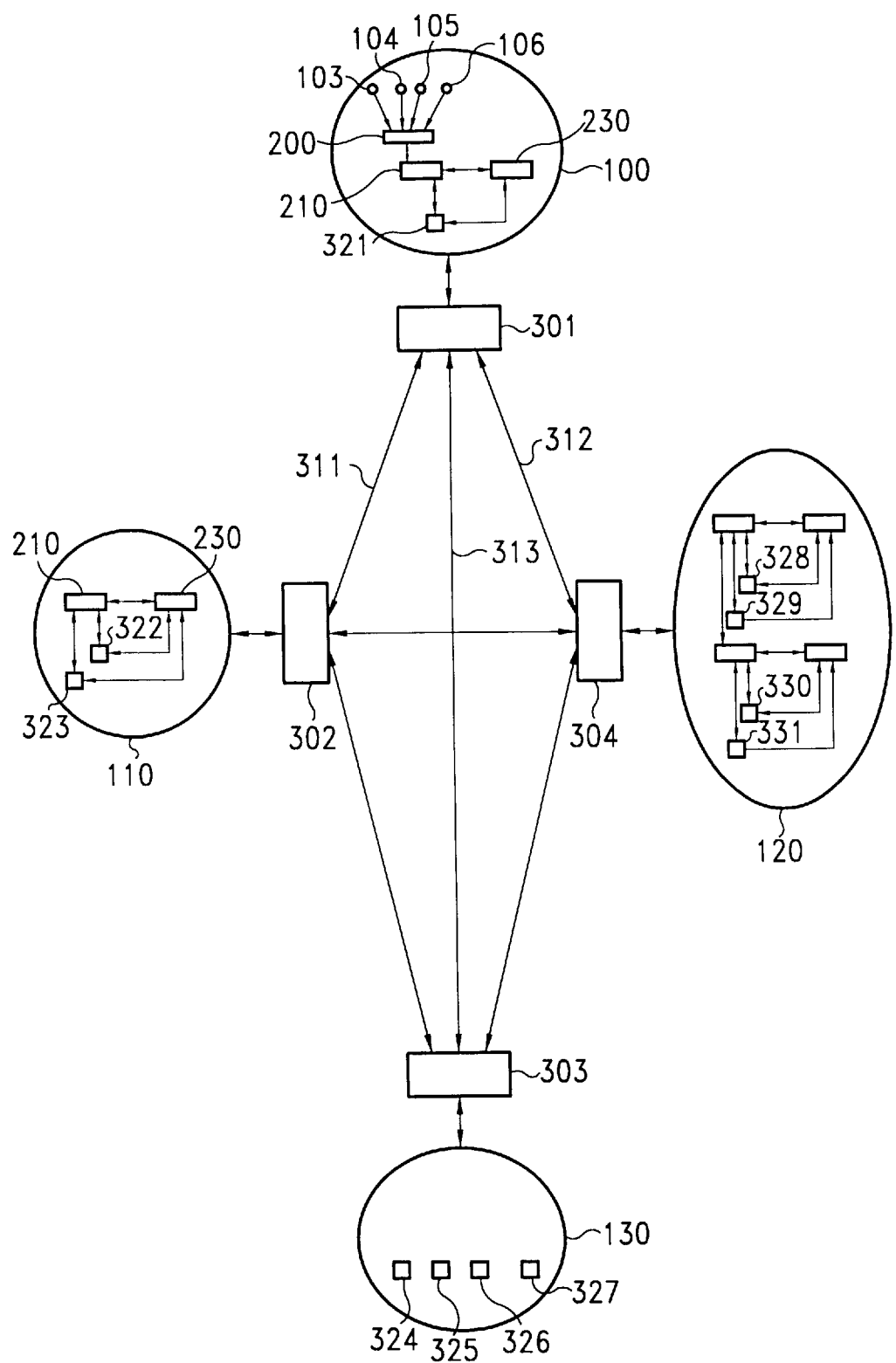
FIG. 3 shows the real time broadcasting system of the present invention on the internet using the traditional architecture.

In the application of the real time broadcasting on the internet of the present invention, the architecture is shown in FIG. 3. The architecture of internet in FIG. 3 is the same as that of the traditional internet. The router 301, 302, 303 and 304 used in the present invention is the same as that of the traditional internet. Particularly, the multi-cast broadcasting system uses the multi-cast router in FIG. 1 other than the router used in the traditional internet. It is why the multi-cast broadcasting system can not be implemented in the traditional internet. Whereas the present invention can be applied in the traditional internet.

In the application on the internet of the present invention, the other specific is that a multi-transmitting system can be connected to another multi-transmitting system in cascade to act as the information provider for the users in the local network. Refer to FIG. 3, the multi-transmitting system in LAN (local network) 100 sends all the information to the multi-transmitting system in LAN (local network) 110. Thus the multi-transmitting system in LAN 110 is used as the information provider for the client 322 and 323. In another configuration of the cascade of the multi-transmitting system is shown in LAN 120. In which, the first level multi-transmitting system is used to provide the information for the client 328 and 329, whereas the second level multi-transmitting system is connected to the first level multi-transmitting system. The first level multi-transmitting system acts as the information provider for the second level multi-transmitting system. The second level multi-transmitting system thus provides information for more clients such as client 330 and 331. Besides, the clients such as 324, 325, 326 and 327 in LAN 130 can use the multi-transmitting system in LAN 100 as the information provider.

In the application of the present invention on the traditional internet, the clients can choose the types of data source according to what the users want, whereas the clients in the multi-cast broadcasting system can not chose the type of data source. For example, the client 324 wants the data sent by data source W103 only, the client 325 wants the data sent by data source W103, X104 and Y105, the client 326 wants the data sent by data source Z106 and the client 327 wants the data sent by data source X104 and Y105. In the multi-cast broadcasting system, the clients 324, 325, 326 and 327 receive the information come from all data sources W103, X104, Y105 and Z106. Whereas the clients in the broadcasting system of the present invention can choose the data source what the user want. Thus the system of the present invention overcomes the problem for the user to choose the data source.

Figure 4A:
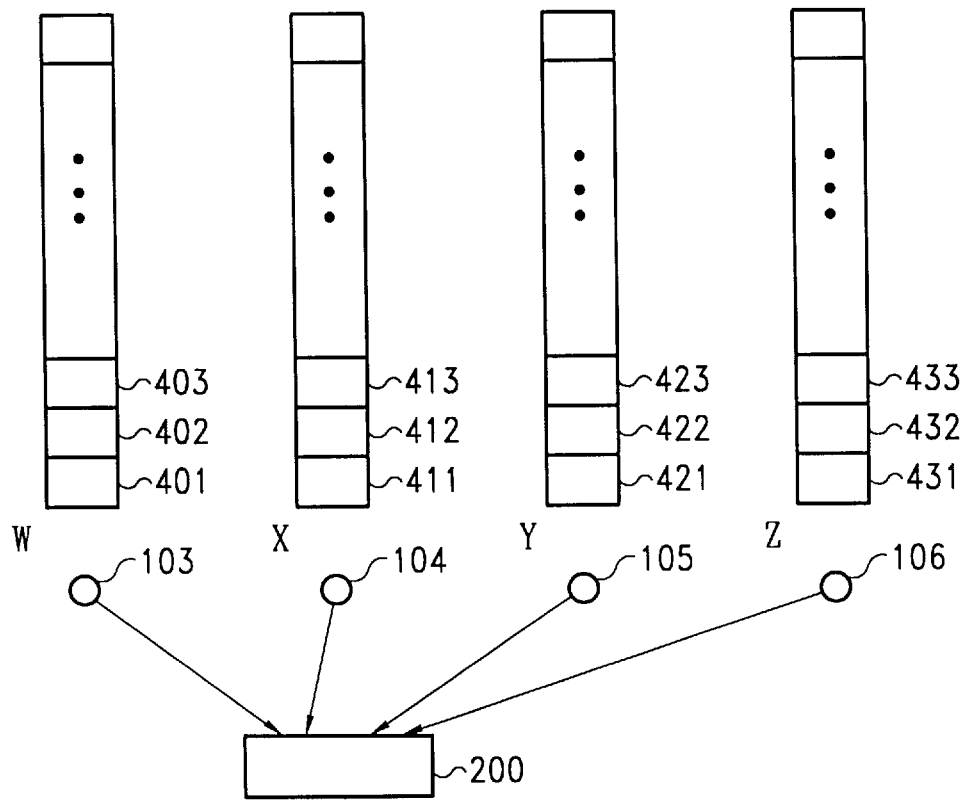
FIG. 4A shows the structure of the data collected and after collected by data-collection processing system.

Because the system of the present invention transmits the data individually according to the request of every client, and the lost packages must be sent, the data structure of the packages must be proceeded. Referring to FIG. 4A, the data transmitted by data source W include package 401, 402, 403 . . . etc. The data transmitted by data source X include package 411, 412, 413 . . . etc. The data transmitted by data source Y include package 421, 422, 423 . . . etc. The data transmitted by data source Z include package 431, 432, 433 . . . etc.

The data collection processing system collects all the packages of all the data sources, and adds the sort number and number representing data source to form the data 400. The sort-number represents the order that the packages 401, 402, 403, 411, 412, 413, 421, 422, 423, 431, 432, 433 . . . etc. arrive at the data collection processing system. Noted that the data collection processing system adds the number representing data source, which represents the kind of the data source. For example, in data 400, the number representing data source "W" is added by the data collection processing system 200, yet the number "1" after "W" is produced by using the TCP/IP protocol when the packages leave the data source. The serial number "1" in sort-number "w1" is added by the data collection processing system 200 too. In the real time broadcasting system of the present invention, the adding of sort-number is not confined to the data collection processing system. It can be performed by the multi-transmitting system either. When there are many levels of multi-transmitting systems connected in cascade, the function of adding the sort-number is carried out by the multi-transmitting system of the upmost level.

Figure 4B:
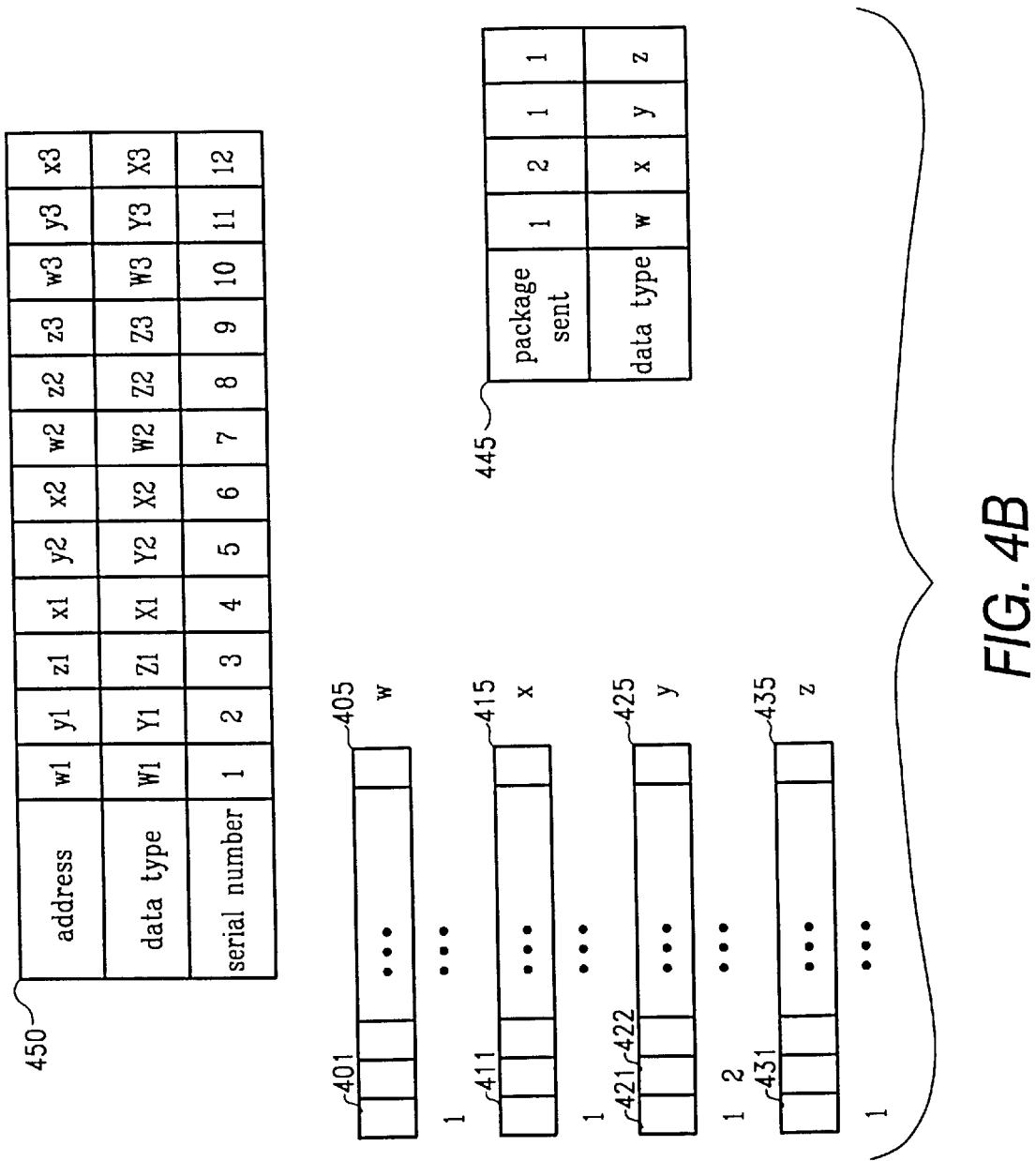
FIG. 4B shows how the index in the multi-transmitting system and the data stored in the memory of data-collection processing system are mapped. In addition, the index used to record the packages sent by the multi-transmitting system is described to illustrate how the data are stored in the data collection processing system and how the data are transmitted by the multi-transmitting system.

The data collection processing system stores the data 400 to the memory and then sends it to the multi-transmitting system. Thus the multi-transmitting system formss an index 450 according to the sort-number, number representing data source and the address where the package is stored. Referring to FIG. 4B, the relationships of the mentioned above is stored. For example, the first package 401 of data source W is stored in the memory at the address w1, the second package 402 of data source W is stored in the memory at the address w2, and the third package 403 of data source W is stored in the memory at the address w3. The relationship of other type of data sources and its packages is the like, which is shown in FIG. 4B.

After the authenticating system examines the username and password, if the user is permitted to login the system of the present invention, the address and the type of data-source which the user wantss will be sent to the multi-transmitting system. If the data received by the multi-transmitting system is the first package, that is to say, the sort-number is 1 (package 401), then the magnitude of the index 445 which records transmitted packages sent by the multi-transmitting system is 1.

Assume that during a little period of time, the authentication system transmits the address of the multi-transmitting system and the serial number of the port of receiving data to the receiving system. After the receiving systems connects to the multi-transmitting system, assume that the data received by the multi-transmitting system is the fifth package in sort-number (package 422 in FIG. 5). The magnitude of the index 445 which records transmitted packages sent by the multi-transmitting system is 5, as shown in FIG. 4B. Thus the packages sent in the second period of time is 4 (5−1=4). In other words, one package is sent by the multi-transmitting system at the first time, and four packages are sent at the second time. The multi-transmitting systems sends the packages received during a period of time once at a time, and send the packages by user datagram protocol. This is why the multi-transmitting system can send all the packages to the user without any package lost.

Figure 5:
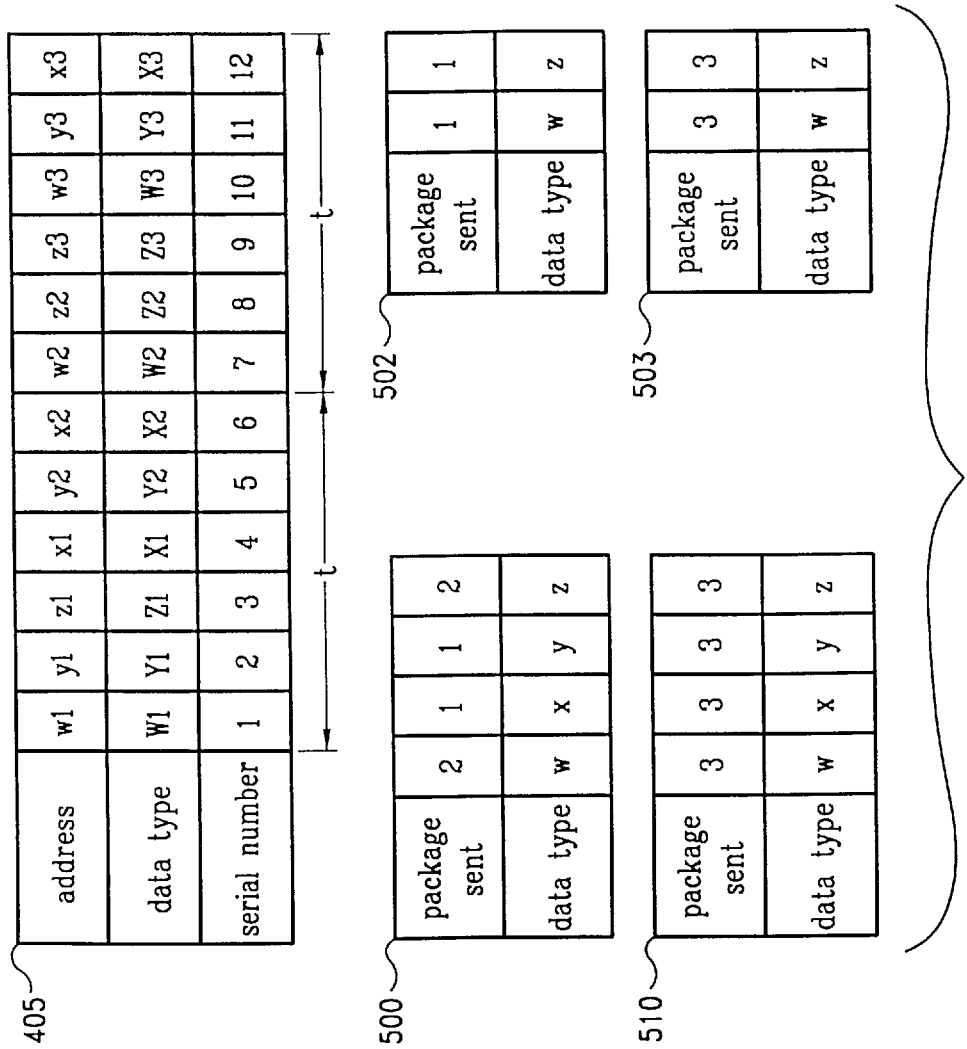
FIG. 5 shows the index in the multi-transmitting system, the index recording transmitted packages sent by the multi-transmitting system and the packages received by the receiving system. The figure mentioned above is described to illustrate how the data are transmitted by the multi-transmitting system and how the data are received in the receiving system.

On the other hand, the multi-transmitting systems of the present invention sends the received packages to the receiving systems every fixed time period (such as t). Refer to FIG. 5, the index 500 represents the packages sent by the multi-transmitting system from the beginning to the time equals t. The index 510 represents the packages sent by the multi-transmitting system from the time equals t to the time equals 2t. If a user wants the data being from data source W103 and Z106, the packages received by the receiving system from the beginning to the time equals t is shown in index 502. The packages received by the receiving system from the time equals t to the time equals 2t is shown in index 503.

If the multi-transmitting systems sends one package per unit time, for example t, or the multi-transmitting systems sends package at the time when it receives package, the utility of bandwidth will be reduced. In the example mentioned above, the packages received by the receiving system are shown in index 502 and 503. If there are two packages from W and two packages from Z, it takes four times of transmitting if the multi-transmitting systems sends one package per unit time. Whereas the multi-transmitting systems of the present invention sends four packages in the memory at a time (two from W and two from Z), according to the subtract of magnitude of index 503 and index 502. Thus the utility of the bandwidth is raised.

When the serial number of data type of received packages are not continuous, e.g. a user receives the packages of the data type Y1, Y3, Y4, . . . The receiving system checked the absence of Y2, then the receiving systems send the absent serial number to the multi-transmitting system. Thus, the multi-transmitting systems send the package stored in the memory according to the index 450, In that the address y2 is mapped from Y2. From the mentioned above, the multi-transmitting systems send the package relative to address y2 to the receiving system. Thus the lost package is presented by the multi-transmitting system again. It is why the broadcasting systems of the present invention do not utilize TCP protocol, and the packages are assured to be received without lost.

Although specific embodiments have been illustrated and described, it will be obvious to those skilled in the art that various modification may be made without departing from the spirit which is intended to be limited solely by the appended claims.

What is claimed is:

1. Apparatus for real time broadcasting system on an internet, comprising:

data collecting means for collecting and processing a plurality of data sent by all data-sources connected to said data-collection processor means;

receiving means for receiving a portion of said plurality of data and sending out an authentication information of a user, said received data being examined for data loss;

authentication means for checking the authentication of the user and transmitting the type of said portion of said plurality of data to said receiving means; and multi-transmitting means for receiving the output of said data collecting means, then sending lost data of the select types of data sources to said receiving means, the loading and address of said multi-transmitting means being sent to said authentication means is used to assign the multi-transmitting means as the source of the receiving means, wherein the output of said multi-transmitting means contains a plurality of serial number representing the order that the data arrived at said data collecting means, wherein the data are sent by the data-sources.

2. The apparatus as claim 1, wherein said multi-transmitting means forms a data address table according to the addresses where the data are deposited, add a data-source representing character to said plurality of data according to the source where the data come from, store the address of said receiving means and the data-source representing character request by said receiving means, receive a missing related signal sent by said receiving means, send a multi-transmitter address loading signal to said authentication means, send a refill signal to said receiving means, and forms an index.

3. The apparatus as claim 2, wherein said missing related signal is used as the reference of transmitting the missing package to said receiving means, said multi-transmitter address loading signal comprises the loading and address of said authentication means, said refill signal comprises the missing package, said index comprises the number representing data-source and said plurality of serial number, and the missing package is sent from said data collecting means through said multi-transmitting means to said receiving means.

4. The apparatus as claim 1, wherein said plurality of serial number is added by said data collecting means according to the order that said plurality of data arrive at said data collecting means.

5. The apparatus as claim 2, wherein said data collecting means is used to form the number represents the data-source, form a data-block, store said data-block in a memory, and transmit the output signal of said data collecting means to said multi-transmitting means, the output signal of said data collecting means comprises a plurality of said data-block.

6. The apparatus as claim 5, wherein said data-block comprises the number representing data-source and said plurality of serial number and the data.

7. The apparatus as claim 2, wherein said receiving means send an identification input signal to said authentication means to prosecute the authentication of the user, transmit said missing related signal to said multi-transmitting means to offer the number representing data-source of the missing package, and receive said refill signal and an identification output signal, wherein said identification output signal comprises the number representing the data-source requested by the user.

8. The apparatus as claim 7, wherein said identification input signal comprises an user input information, the address of said receiving means, and the number representing the data-source requested by the user, wherein said user input information comprises the username and password of the user sent by said receiving means.

9. The apparatus as claim 7 wherein said identification output signal comprises a login result signal, the address of said multi-transmitting means, a number representing data-block receiving port, said login result signal is used to show that whether the user is permitted to login said real time broadcasting apparatus.

10. The apparatus as claim 2, wherein said authentication means receives said identification input signal and said multi-transmitter address loading signal, send out the address of said multi-transmitting means and said identification output signal, said authentication means compares whether the user input information is the same as the stored user's information, and receives the number representing data-source requested by the user.

11. The apparatus as claim 1, wherein said plurality of serial number is added by said multi-transmitting means according to the order that the data arrived at said multi-transmitting means.

12. The apparatus as claim 1, wherein said missing related signal comprises the number representing the data-source of the missing package.

13. The apparatus as claim 1, wherein said multi-transmitter address loading signal comprises the loading and address of said multi-transmitter means.

14. The apparatus as claim 1, wherein said refill signal comprises the missing package.

15. The apparatus as claim 1, wherein said data comprises a sub-data and an individual timing serial number, wherein said individual timing serial number is added to said sub-data by said data-source according to the order that said sub-data leave said data-source.

16. Method for real time broadcasting on an internet comprising:
 collecting and processing a plurality of data sent by all data-sources to form a data sequence, wherein the data comprises a plurality of data-source serial number, said plurality of data-source serial number being composed of continual numbers;
 checking the authentication of a user and assigning a information source with minimum loading to provide information for the user according to a loading-address table;
 receiving and storing the processed data, the stored data being transmitted to the authenticated user and formed a data-address table;
 receiving a portion of said plurality of data and sending out an authentication information of the user, said received data being examined for data loss by checking the absence of said data-source serial number; and
 transmitting said lost data to the user according to a serial number corresponding to an abscent data-source serial number of said data-source serial number.

17. The method as claim 16, wherein the data from all data sources are processed by adding a data-source representing character to the data according to where the data come from, and serializing by adding the serial number, said data-sequence comprising the address of the stored data and the data itself.

18. The method as claim 16, wherein said loading-address table of the information sources is formed according to the address and loading of said information sources.

19. The method as claim 16, wherein said data sequence comprises the serial number, the data-source representing character and the data itself.

20. The method as claim 16, wherein said data-address table comprises the address of the stored data, the serial number, the data-source representing character and the data-source serial number.

21. The method as claim 16, wherein said authentication information comprises the username and password of the user.

* * * * *